United States Patent [19]

Sortwell et al.

[11] Patent Number: 4,845,192
[45] Date of Patent: * Jul. 4, 1989

[54] METHOD OF RAPIDLY DISSOLVING POLYMER GELS IN WATER

[75] Inventors: Edwin T. Sortwell, Wheaton; Alan R. Mikkelsen, Downers Grove, both of Ill.

[73] Assignee: Diatec Polymers, Batavia, Ill.

[*] Notice: The portion of the term of this patent subsequent to Jul. 16, 2002 has been disclaimed.

[21] Appl. No.: 844,139

[22] Filed: Mar. 26, 1986

Related U.S. Application Data

[60] Continuation-in-part of Ser. No. 708,247, Mar. 5, 1985, which is a division of Ser. No. 594,559, Mar. 29, 1984, Pat. No. 4,529,794.

[51] Int. Cl.$^4$ ................................................ C08C 1/00
[52] U.S. Cl. ..................... 528/499; 528/502; 366/102; 366/52
[58] Field of Search ............... 528/499, 502; 366/102, 366/52

[56] References Cited

U.S. PATENT DOCUMENTS

| Re. 28,474 | 7/1974 | Anderson et al. | 260/29.6 H |
|---|---|---|---|
| Re. 28,576 | 10/1975 | Anderson et al. | 260/2.6 H |
| 3,541,062 | 3/1967 | van Dierendonck | 528/499 |
| 3,852,191 | 12/1984 | Zucker et al. | 210/71 |
| 4,113,688 | 9/1978 | Pearson | 260/29.6 PM |
| 4,295,933 | 10/1981 | Smith | 162/168 A |
| 4,499,214 | 2/1985 | Sortwell | 523/336 |
| 4,529,794 | 7/1985 | Sortwell et al. | 528/499 |
| 4,603,156 | 7/1986 | Sortwell | 523/324 |

FOREIGN PATENT DOCUMENTS

| 1753783 | 2/1984 | Australia . |
|---|---|---|
| 542866 | 3/1985 | Australia . |
| 199691 | 10/1986 | European Pat. Off. . |
| 2108703 | 8/1972 | Fed. Rep. of Germany . |
| 53-81547 | 7/1978 | Japan . |
| 53-81548 | 7/1978 | Japan . |
| 365706 | 1/1963 | Switzerland . |
| 512092 | 8/1939 | United Kingdom . |
| 2067908 | 8/1981 | United Kingdom . |

OTHER PUBLICATIONS

Comitrol ® Catalog-Urschel Laboratories, Inc.-Bulletin No. 706-Mar. 1973.

Primary Examiner—John Kight
Assistant Examiner—M. L. Moore
Attorney, Agent, or Firm—Marshall, O'Toole, Gerstein, Murray & Bicknell

[57] ABSTRACT

A method of rapidly dissolving particles of water soluble polymer gels in water. A suspension of gel particles is formed and subjected to conditions of high shear in a particle size reduction apparatus whereby finely sliced particles are formed and instantly dissolve in water. Sufficient water is present that heat is dissipated and molecular degradation of the polymer is avoided.

66 Claims, 2 Drawing Sheets

METHOD OF RAPIDLY DISSOLVING POLYMER GELS IN WATER

CROSS-REFERENCE TO RELATED APPLICATIONS

This is a continuation-in-part of copending, commonly assigned application Ser. No. 708,247, filed Mar. 5, 1985 in the names of Edwin T. Sortwell et al., which is a division of application Ser. No. 594,559, filed Mar. 29, 1984 the names of Edwin T. Sortwell et al, now U.S. Pat. No. 4,529,794 issued July 16, 1985.

BACKGROUND OF THE INVENTION

1. Field of the Invention

This invention relates generally to the dissolution of polymers in water and, more particularly, this invention relates to a method of rapidly dissolving gels of water soluble polymers in water.

2. Description of Related Art

The use of solutions of water soluble polymers in thickening and flocculating applications is well known. Such applications include the clarification of aqueous solutions in mining and papermaking, and treatment of sewage and industrial wastes. Such solutions of polymers are also useful as stabilizers for drilling muds, and in the secondary recovery of petroleum by water flooding.

Although these polymers are most often available commercially as powders or as finely divided solids, they are most frequently utilized in aqueous solutions. This necessitates that the solid polymer be dissolved in water. Although the various polymers are more or less soluble in water, difficulty is often experienced in preparing aqueous polymer solutions because of their slow rate of dissolution and because the solid polymer is not readily dispersible in water.

Additional problems are associated with dissolving polymer gels in water. In one prior approach, a polymer gel is extruded, comminuted and then gently stirred in water for a period of several hours. While this prior method does reduce the time required for solution preparation, as measured from the gel pellet stage, gentle stirring for very substantial amounts of time is required. This requires large mixing tanks and long mixing times, since instantaneous dissolution of polymer is not obtained. As a result, the total time required for polymer dissolution is comparable to that required using dry polymer.

SUMMARY OF THE INVENTION

It is an object of the invention to overcome one or more of the problems described above.

According to the present invention, particulate gels of water soluble polymers are very rapidly (or instantaneously) dissolved in water by a method which comprises the steps of forming a suspension of polymer gel particles in water and, simultaneously with or immediately subsequent to the formation of the suspension, subjecting the suspension to instantaneous and momentary conditions of extremely high shear forces whereupon the gel particles are finely sliced and thereby dissolved.

The proportion of water to gel and the conditions of shear are selected to avoid molecular degradation of the polymer.

The particle size reduction is carried out in an apparatus suitable for size reduction of particles which are suspended in a liquid. For example, a suitable apparatus comprises an impeller which is rotatable at a high rate of speed, with a cylindrical array of generally radially directed blades circumferentially surrounding the impeller, with outwardly directed discharge spaces defined between adjacent blades.

The mixture discharged from the apparatus is essentially a solution of polymer and water, but may contain some undissolved microgel particles which go completely into solution within a short period, with or without further agitation.

By means of the invention, a useful solution of polymer and water is very rapidly obtained without agglomeration of particles. The need for mixing is eliminated.

The solution can be transferred to tanks for storage, used virtually immediately or, alternatively, used in chemical reactions with other reactants.

Further objects and advantages of the invention will be apparent to those skilled in the art from the following detailed description, taken in conjunction with the drawings and the appended claims.

DETAILED DESCRIPTION OF THE INVENTION

The Water Soluble Polymer Gels

Figures 1, 2:
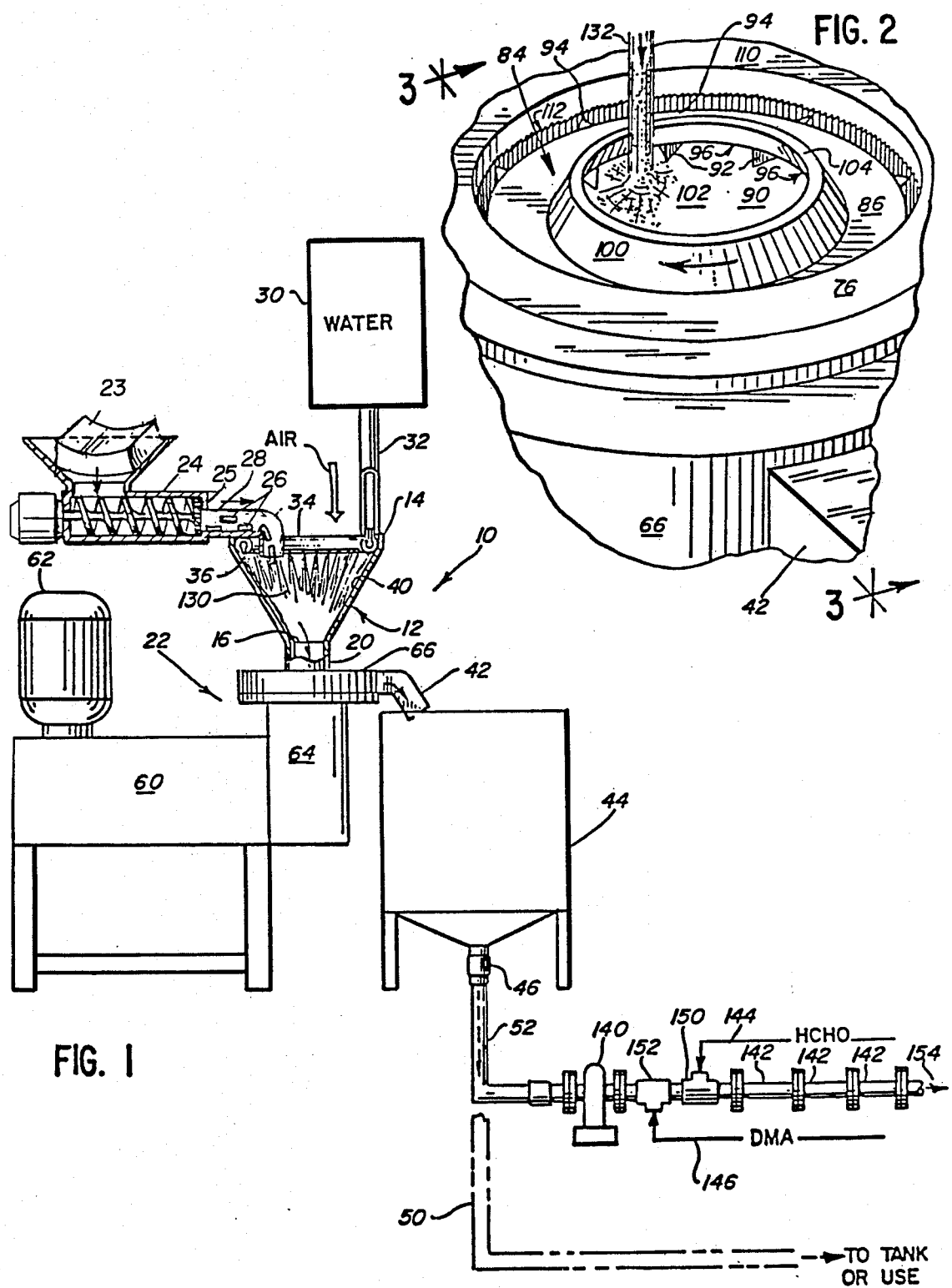
FIG. 1 is a partially schematic view, taken partially in section, of an apparatus suitable for carrying out the method of the invention.
FIG. 2 is a perspective view of a portion of the apparatus of FIG. 1, with some elements omitted for clarity.

The polymer gels which may be dissolved according to the invention are well known in the art and have been described in numerous publications and patents. They include, but are not limited to, gels of water soluble condensation polymers and gels of vinyl addition polymers such as polyacrylamides and copolymeric derivatives of acrylamide with, for example, acrylic acid, maleic anhydride, acrylonitrile, styrene, allyl or diallyl amines or dimethylaminoethylmethacrylate (DMAEM). Such polymers may be nonionic, anionic or cationic.

The molecular weight of the polymers may vary over a wide range, e.g. between about 10,000 and 25,000,000 and molecular weight is not a critical parameter in this invention. The invention is particularly useful with respect to gels of acrylamide polymers, the molecular weights of which are generally in excess of 1 million.

As used herein, the term "polymer" is understood to include polymers which are soluble in water to a significant degree. Gels of the polymers may have a substantial water content.

As defined in the *Condensed Chemical Dictionary*, 10th ed., (Van Nostrand Reinhold, 1981), a gel is a solution in which a disperse phase (in this case, the polymer) has combined with a continuous phase (water, in this case) to produce a viscous, jelly-like product. The molecular weight of the polymer is sufficiently high to render the solution solid.

As is well known in the art, gels are commonly produced by gel polymerization in water.

Gels of water soluble polymers which may be dissolved according to the invention have maximum water contents which vary with the identity of the polymer. For example, homopolymer polyacrylamide gels have maximum water contents of about 70-75 wt. %. Homopolymer acrylate salt gels have maximum of about 60 wt. %. Gels of homopolymers of the following vinyl addition monomers have maximum water contents, as indicated.

TABLE I

| Monomer | Maximum Water Content (wt. %) |
| --- | --- |
| Dimethylaminoethylmethacrylate-dimethyl sulfate (DMAEM.DMS) | 10 |
| Dimethylaminoethylmethacrylate-methyl chloride (DMAEM.MeCl) | 20 |
| Dimethylaminoethylacrylate - methyl chloride (DMAEA.MeCl) | 25 |
| 2-acrylamido-2-methyl propane sulfonic acid (AMPS - a trademark of Lubrizol Corp.) | 35 |

Acrylamide may be copolymerized with acrylate salts or any of the monomers indicated in Table I to obtain copolymers, the gels of which have maximum water contents between those of homopolymer polyacrylamide gels and homopolymers of the respective comonomer.

As the non-acrylamide comonomer content of a copolymer increases, the maximum solids content of the polymer gel increases.

While the pellet size of the gel is not critical, the pellets will generally be less than about ¼" in length and diameter.

THE DISSOLUTION METHOD AND APPARATUS

Referring now to the drawings, the method of the invention and a preferred embodiment of an apparatus suitable for carrying out the method will be described.

FIG. 1 illustrates an apparatus, generally designated 10, comprising a vertical frustoconical solid/water contacting means, generally designated as funnel 12, which may be open at its larger upper end 14. The frustum 16 of the funnel 12 defines an outlet communicating via a cylindrical conduit 20 with a particle size reduction apparatus, generally designated 22, and described in more detail below. A source of polymer gel particles supplies gel (shown as a slab 23) to feeding means, such as a gel extruder 24, for example, which extrudes the gel through a die plate 25 to produce gel particles 26. (The extruder 24 may include an integral comminuter (not shown) adjacent the die plate 25 in order to form particles). The particles 26 are fed through a conduit 28 to the interior of the funnel 12.

The gel may be produced by commercial gel polymerization equipment (not shown for simplicity), comminuted and extruded directly into the funnel 12 or, alternatively, comminuted and extruded directly into water to produce a suspension, and then pumped to the funnel 12. If desired, as an alternative, water may be added in admixture with the gel (as in the extruder 24) prior to extrusion and comminution.

A source of water 30 supplies water through a conduit 32 to water distribution means, such as the illustrated annular conduit 34 which is disposed within the upper end 14 of the funnel 12. The conduit 34 is provided with a plurality of discharge holes 36 on the lower side thereof for discharging water to the inner conical surface 40 of the funnel 12.

Pumps, valves, etc. associated with the respective sources of polymer and water are omitted for clarity.

The particle size reduction apparatus 22 discharges polymer solution through an outlet 42 to a holding tank 44 with a discharge outlet 46 at the bottom thereof. If desired, the tank 44 may be equipped with a mixer (not shown) to assist in removal of entrained air from the solution. Stirring is not required, however, to obtain complete dissolution of the gel.

As described in more detail below, polymer solution may be removed from the tank 44 through the outlet 46 through a line 50, shown in dotted lines, directly to a holding tank or for immediate use. Alternatively, the solution may be removed from the tank 44 through the outlet 46 and a line 52 for immediate in-line chemical reaction, as described below.

As seen in FIG. 1, the particle size reduction apparatus 22 generally comprises a main housing 60 supporting a motor 62, an impeller shaft housing 64, and an impeller housing 66.

Figure 3:
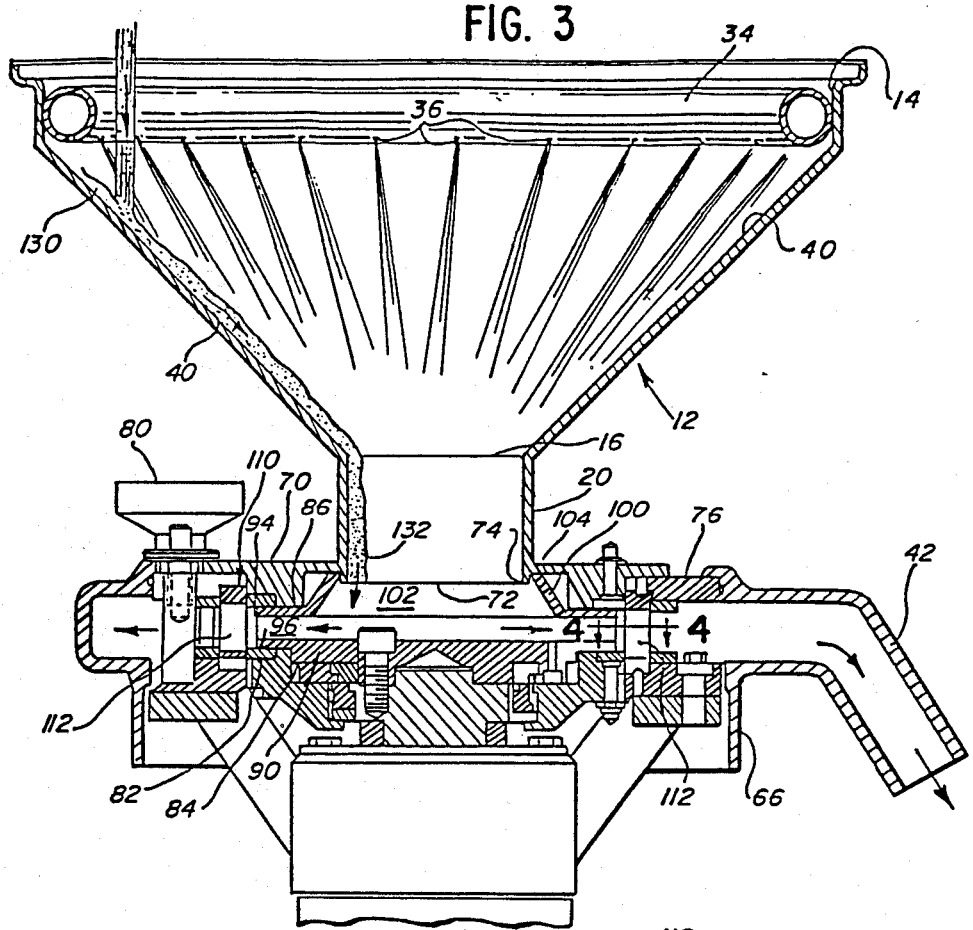
FIG. 3 is a sectional elevation of the apparatus of FIGS. 1 and 2 taken generally along line 3—3 of FIG. 2.

Referring now to FIGS. 2 and 3, the interior of the impeller housing 66 will be described in more detail.

As best seen in FIG. 3, the outlet conduit 20 of the funnel 12 includes a radial flange 70 which extends outwardly from the conduit 20 at a point slightly above the bottom edge 72 of the conduit 20 so as to define a circumferential lip 74 thereon. The outer periphery of the flange 70 rests upon and is supported by an annular raised surface 76 on the housing 66. The funnel 12 is secured to the housing 66 by hold-down assemblies 80.

Mounted for rotation within a cavity 82 in the housing 66 is an impeller, generally designated 84, which comprises an open cover plate 86, a bottom plate 90, and a plurality of upstanding guide vanes 92 disposed between the cover plate 86 and the bottom plate 90. Each guide vane terminates at its radially outermost end in a cutting tip 94. Adjacent guide vanes define a plurality of radial discharge openings 96.

The cover plate 86 includes an inverted frustoconical wall 100 which defines a central opening 102. The flange 70 of the funnel 12 rests upon an upper edge 104 of the wall 100, with the funnel lip 74 extending into the central opening 102.

The impeller 84 is driven for high speed (e.g. up to 13,000 rpm) rotation by the motor 62 through a drive train (not shown) in the housing 60.

Figure 4:
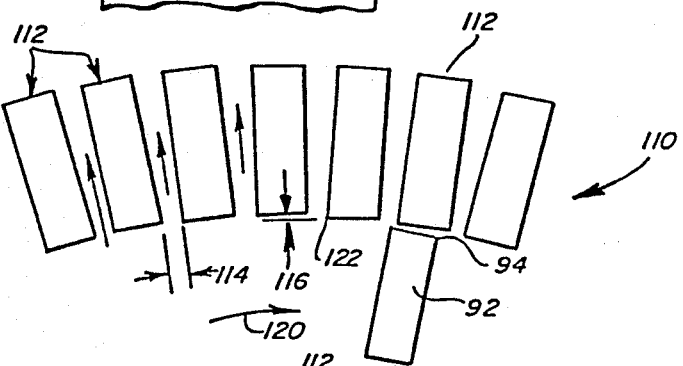
FIG. 4 is a sectional view of the apparatus of FIG. 3 taken generally along line 4—4 of FIG. 3; and, FIG. 5 is a modified embodiment of the apparatus of FIG. 4.
Figure 5:
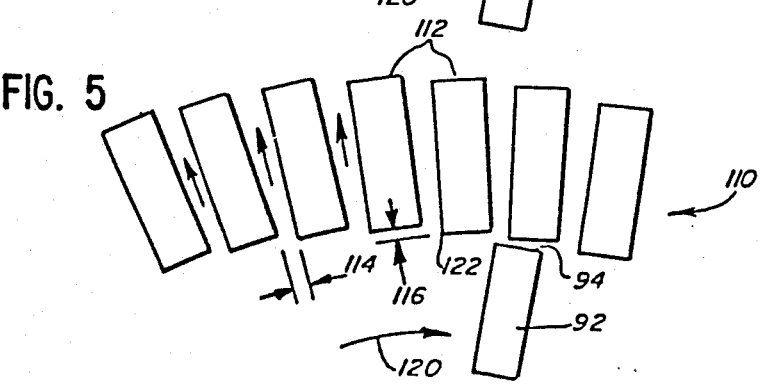

The impeller 84 is surrounded about its circumference by a cylindrical array 110 of cutting blades 112. As best seen in FIGS. 4 and 5, the blades 112 are fixed so as to define openings 114 therebetween of substantially uniform size. A gap 116 defined between the impeller cutting tips 94 and the blades 112 determines the so-called "depth of cut" of the apparatus.

As seen in FIGS. 4 and 5, the impeller 84 rotates in the direction of the arrow 120, and the leading edges 122 of the blades 112 define cutting edges for finely dividing particulate matter. As material is reduced in size, it is discharged radially outwardly through the openings 114.

The respective blade arrays 110 of FIGS. 4 and 5 differ from each other in terms of the angle of the blades 112 with respect to the vanes 92. The blades 112 of FIG. 4 are generally radially aligned with the vanes 92, while those of FIG. 5 are disposed at an angle of about 2° from the vanes 92. As is known in the art, variation of the angle of the blades 112 varies the depth of cut 116, with the depth of cut 116 increasing as the angle between the vanes and the blades increases. A blade/vane angle of 0°-5° is generally suitable for the practice of this invention, depending on the number of blades 112 in the blade array 110.

The apparatus 22 of the drawings is a commercially available apparatus marketed by Urschel Laboratories, Inc. of Valparaiso, Ind. under the trademark Comitrol ® Model 1500. This apparatus is used in the food processing industry for extremely fine size reduction or emulsification of such foods as peanuts (i.e. peanut butter production) or vegetables. The Urschel Comitrol ® Model 1500 blade array 110 has an internal diameter of about 8″ with a variety of available blade arrays having between 50 and 222 blades per array. In the invention, an array having 180 blades is preferred with a blade/vane angle of 0°, openings 114 of greater than 0.0207 inches and a gap 116 of 0.0018 inches.

It has been found that, in dissolving gels according to the invention, it may be desirable to use a blade array having less than blades (e.g. about 160-200, and preferably 180 blades) with a 0° blade/vane angle in order to avoid the production over overly thin or overly large slices (or wafers). If the slices are too thin, the viscosity of the resulting solution may be so high as to prevent or hinder efficient air removal therefrom. If the particles are too large, instantaneous gel dissolution may not occur.

The apparatus 22 of the drawings is a preferred apparatus for carrying out the method of the invention, although the selection of particular components of the apparatus is not critical as a variety of different types of size reduction equipment are suitable. The functions of the various elements of the apparatus will be apparent to those skilled in the art from the following description of the inventive method with reference to the drawings.

In accordance with the invention, the apparatus 22 accomplishes dissolution of polymer gel particles in water. As is well known in the art, usable concentration of polymers in water is a function of the type of polymer, the molecular weight of the polymer, the temperature etc. With acrylamide polymers, for example, aqueous solutions comprising between about 0.05 and 6 weight percent of polymer in water are useful for various applications.

The inventive method allows instantaneous dissolution of the polymer gel into water, and the respective feed rates of gel and water to the apparatus 22 are selected according to the desired polymer concentration in the solution. In the apparatus of the drawings, for example, a water feed rate of about 25-14 30 gal/min is typical, with the feed rate of polymer chosen to provide a total weight flow rate of polymer and water wherein the polymer comprises a selected percentage within the range of about 0.05 and 6 weight percent.

In accordance with the invention, water is supplied from the source 30 to the discharge conduit 34 at a selected rate. The water discharged from the holes 36 defines a stream or film 130 on the funnel surface 40. Polymer gel pellets, generally of an approximate size of ¼″ (diameter and length) are fed from the polymer source 24 to the funnel surface 40 where they contact the water stream or film 130. In the embodiment of the drawings, the polymer is discharged to a point above and off-center of the funnel frustum 16 to assure good mixing of the polymer with the water in the funnel. It should be noted that the water flow in the figures is downwardly directed, without a rotational swirl, but it is not critical that water flow be free of such a swirl.

Alternatively, if desired, the polymer inlet may be positioned over center of the frustum 16 so that polymer first contacts the water in the opening 102 of the impeller 84.

If desired, the water may be introduced to the system by contact with the gel prior to the extrusion thereof.

The pumping action of the impeller 84 creates an eductive effect which draws air from the environment into the funnel. Upon contact, the gel and water form a suspension of gel particles entrained in the water.

As schematically illustrated in FIG. 2, the suspension, generally designated 132, is discharged from the conduit 20 directly into the impeller 84. The impeller 84 rotates at an extremely high rate (e.g., 10,000 to 13,000 rpm). As a result, the gel suspension is immediately discharged radially outwardly through the discharge openings 96 to the gap 116 between the vanes 92 and the blades 112 where the polymer particles are subjected to instantaneous and momentary conditions of extremely high slicing shear whereby extremely thin wafers or slices having a thickness equal to the depth of cut 116 are produced, which instantly dissolve without the need for additional mixing.

The extremely high shear conditions experienced by the gel particles result in slicing of the particles to extremely fine sizes. However, significant molecular degradation or loss of molecular weight of individual particles is not experienced, and this is critical for the success of the invention. It is believed that such degradation is avoided by heat dissipation in water.

It is important that the proportion of water to gel, and the conditions of shear be selected so as to provide size reduction to thin wafers without molecular degradation of the particles. As will be explained below, the presence of molecular degradation is readily ascertainable by comparing the viscosity of the resulting solution with that of a solution of identical concentration made by a conventional mixing method.

If an Urschel Comitrol ® Model 1500 apparatus is used, selection of the number of blades and their angle thereof in the blade array 110 is important, and will depend upon the particular polymer, its gel pellet size, the water and polymer flow rates, etc. Selection of the blade array is done empirically. The number of blades 112 in the array 110 must be sufficient to provide the desired slice thickness, yet not so great as to result in openings 114 of such a small size that the opening will be plugged by reduced gel particles.

Similarly, the angle between the cutting tips 92 and the blades 112 is chosen to provide optimum size reduction. If the angle is too small, plugging may occur as particles are not sufficiently reduced in size to pass through the openings 114.

In the apparatus of the drawings, it has been found that good performance is attainable with a 25-30 gal/min water flow rate, a 200 blade (or less) array, and an angle of 0°-5° between the impeller tips and the blades. The use of a 180 blade array and an angle of 0° may result in reduced entrainment and instantaneous gel dissolution.

For example, excellent results have been obtained with a polyacrylamide gel (¼″ pellets, 70-72% water content) using an Urschel Comitrol ® Model 1500 apparatus with 180 blades and a 28-30 blade/vane ang Such an apparatus provides a depth of cut of 0.0018″, with radial discharge openings of greater than 0.0207" between blades. A water flow rate of 28-30 gal./min. and sufficient gel to provide a 7.2 wt. % gel in water solution were fed into the apparatus, thus providing a nominal 2 wt. % polymer in water solution. No plugging was encountered, and any entrained air in the solution was very easily separated.

Those skilled in the art will appreciate from the foregoing that selection of the size of machine, number of blades, and blade/impeller angle will depend on a number of variables, including water and polymer flow rates, the molecular weight of the polymer, the type of polymer, etc., and that such selection can be readily accomplished empirically.

The shearing conditions and consequent wafer formation allows instantaneous dissolution. The solution is discharged from the impeller 84 and through the openings 114 in the blade array 110. From the openings 114 it is discharged through the outlet 42 to the tank 44.

As noted above, the solution in the tank 44 is ready for immediate end use and may be removed through the line 50 to a holding tank, a mixing tank for further dilution, and after dilution to the site of end use.

Alternatively, the solution in the tank 44 may be withdrawn immediately for use in an in-line chemical reaction. If the dissolved polymer is a nonionic polyacrylamide, such chemical reactions include aminomethylation (Mannich reaction) or hydrolysis to partial polyacrylate form as by reaction with caustic solution. The tertiary aminomethylated polyacrylamide may be subsequently quarternized by, for example, methyl chloride or dimethyl sulfate.

For example, the solution may be withdrawn from the tank 44 through the outlet 46 and the line 52 and pumped, as by a lobe pump 140, through a series of static or mechanical in-line mixers 142. Chemical reactants, such as formaldehyde (HCHO) and dimethylamine (DMA) may be introduced into the line 52 through lines 144 and 146, respectively, which join the line 52 at T-unions 150 and 152. (The formaldehyde and DMA are metered through metering pumps (not shown) in lines 144 and 146.) The product is removed at 154 for direct use or further reaction.

The method of the invention is especially advantageous in producing aqueous polymer solutions for high volume usage such as in mining, papermaking, waste treatment or enhanced oil recovery operations where prior methods required large volume mixing and/or holding tanks. Further, the inventive method lends itself to oxygen exclusion during solution preparation, as would be required in enhanced oil recovery applications where oxidative polymer degradation is to be avoided. In this case, the solution is prepared with the exclusion of air from the system, and with a purge or blanket of inert gas provided to the apparatus.

The foregoing detailed description is given for clearness of understanding only, and no unnecessary limitations are to be understood therefrom, as modifications within the scope of the invention will be obvious to those skilled in the art.

We claim:

1. A method of rapidly dissolving particles of a gel of a water soluble polymer in water, comprising the steps of:
    (a) contacting said particles with water to form a suspension of said particles in water; and,
    (b) simultaneously with or immediately after formation of said suspension subjecting said suspension to instantaneous and momentary conditions of high cutting shear effective to finely slice said particles, said shear conditions and the proportion of said water to said polymer in said suspension being selected to avoid molecular degradation and produce a solution of said polymer in said water.

2. The method of claim 1 wherein said polymer comprises between about 0.05 weight percent and 6 weight percent, inclusive, of the total weight of said water and said polymer.

3. The method of claim 1 wherein step (b) is carried out in a particle size reduction apparatus comprising a rotatable impeller and a cylindrical array of generally radially directed blade members circumferentially surrounding said impeller, with radial discharge spaces defined between adjacent blades.

4. The method of claim 3 wherein said discharge spaces are of substantially uniform width.

5. The method of claim 4 wherein said blades and said impeller are offset from each other by an angle of about 0°-5°.

6. The method of claim 5 wherein said array includes 200 blades or less.

7. The method of claim 4 wherein the number of said blades and the angle of offset between said impeller and said blades is selected such that said particles are sliced to a thickness of about 0.0018" or less.

8. The method of claim 1 wherein said suspension is formed prior to step (b).

9. The method of claim 8 wherein said suspension is formed by contacting gel particles of said polymer with a stream of water in mixing means communicating with a particle size reduction apparatus.

10. The method of claim 9 wherein said mixing means comprises a source of polymer gel particles, a source of water, means for defining a stream of said water, and means for delivering said particles to said stream for mixing thereof.

11. The method of claim 10 wherein said mixing means is a vertical frustoconical funnel having means for forming said stream on the interior conical surface thereof.

12. The method of claim 11 wherein said means for forming said stream comprises a reservoir defined above the inner circumferential surface of said funnel, including means for discharging water downwardly from said reservoir onto said surface to form said stream.

13. The method of claim 12 wherein an outlet is formed at the frustum of said funnel and said particles are directed toward said stream at a point spaced above and off-center of said frustum.

14. The method of claim 12 wherein an outlet is formed at the frustum of said funnel and communicates with a particle size reduction apparatus comprising a rotatable impeller and a cylindrical array of generally radially directed blade members circumferentially surrounding said impeller, with radial discharge spaces defined between adjacent blades.

15. The method of claim 14 wherein said discharge spaces are of substantially uniform width.

16. The method of claim 15 wherein said blades and said impeller are offset from each other by an angle of about 0°-5°.

17. The method of claim 16 wherein said array includes 200 blades or less.

18. The method of claim 3 wherein said solution is discharged from said size reduction apparatus with entrained air to a tank for agitation to release said air from said solution prior to further transfer or processing of said solution.

19. The method of claim 1 wherein said gel is contacted with water prior to comminution thereof to form said particles.

20. The method of claim 1 wherein said polymer is an acrylamide polymer.

21. The method of claim 20 wherein said polymer is an acrylamide homopolymer.

22. The method of claim 20 wherein said polymer is a copolymer of acrylamide and a comonomer.

23. The method of claim 22 wherein said comonomer is selected from the group consisting of dimethylaminoethylmethacrylate, dimethylaminoethylacrylate, 2-acrylamido-2-methyl propane sulfonic acid, and derivatives thereof.

24. The method of claim 23 wherein said polymer is a copolymer of acrylamide and dimethylamine-ethylmethacrylate-dimethyl sulfate.

25. The method of claim 23 wherein said polymer is a copolymer of acrylamide and dimethylaminoethylmethacrylate-methyl chloride.

26. The method of claim 23 wherein said polymer is a copolymer of acrylamide and dimethyl-amino-ethylacrylate-methyl chloride.

27. The method of claim 23 wherein said polymer is a copolymer of acrylamide and 2-acrylamido-2-methyl propane sulfonic acid.

28. The method of claim 1 wherein said polymer is a homopolymer or copolymer of an acrylate salt.

29. The method of claim 1 wherein said polymer is a vinyl addition polymer.

30. The method of claim 1 wherein said polymer is a condensation polymer.

31. A method of rapidly dissolving particles of a gel of a water soluble polymer in water, comprising the steps of:
(a) contacting said particles with water to form a suspension of said particles in water; and,
(b) simultaneously with or immediately after formation of said suspension subjecting said suspension to instantaneous and momentary conditions of high cutting shear effective to finely slice said particles, said shear conditions and the proportion of said water to said polymer in said suspension being selected to avoid molecular degradation and produce a solution of said polymer in said water, said step (b) being carried out in a particle size reduction apparatus comprising a rotatable impeller and a cylindrical array of generally radially directed blade members circumferentially surrounding said impeller, with radial discharge spaces defined between adjacent blades, said blades being offset from said impeller at an angle of about 0°–5°.

32. The method of claim 31 wherein said polymer comprises between about 0.05 weight percent and 6 weight percent, inclusive, of the total weight of said water and said polymer.

33. The method of claim 31 wherein said discharge spaces are of substantially uniform width.

34. The method of claim 33 wherein said blades and said impeller are offset from each other by an angle of about 0°.

35. The method of claim 34 wherein said array includes about 180 blades.

36. The method of claim 31 wherein said suspension is formed prior to step (b).

37. The method of claim 36 wherein said suspension is formed by contacting gel particles of said polymer with a stream of water in mixing means communicating with a particle size reduction apparatus.

38. The method of claim 37 wherein said mixing means comprises a source of polymer gel particles, a source of water, means for defining a stream of said water, and means for delivering said particles to said stream for mixing thereof.

39. The method of claim 38 wherein said mixing means is a vertical frustoconical funnel having means for forming said stream on the interior conical surface thereof.

40. The method of claim 39 wherein said means for forming said stream comprises a reservoir defined above the inner circumferential surface of said funnel, including means for discharging water downwardly from said reservoir onto said surface to form said stream.

41. The method of claim 40 wherein an outlet is formed at the frustum of said funnel and said particles are directed toward said stream at a point spaced above and off-center of said frustum.

42. The method of claim 40 wherein an outlet is formed at the frustum of said funnel and communicates with a particle size reduction apparatus comprising a rotatable impeller and a cylindrical array of generally radially directed blade members circumferentially surrounding said impeller, with radial discharge spaces defined between adjacent blades.

43. The method of claim 42 wherein said discharge spaces are of substantially uniform width.

44. The method of claim 43 wherein said blades and said impeller are offset from each other by an angle of about 0°.

45. The method of claim 44 wherein said array includes about 180 blades.

46. The method of claim 31 wherein said solution is discharged from said size reduction apparatus with entrained air to a tank for agitation to release said air from said solution prior to further transfer or processing of said solution.

47. The method of claim 31 wherein said gel is contacted with water prior to comminution thereof to form said particles.

48. The method of claim 31 wherein said polymer is an acrylamide polymer.

49. The method of claim 48 wherein said polymer is an acrylamide homopolymer.

50. The method of claim 48 wherein said polymer is a copolymer of acrylamide and a comonomer.

51. The method of claim 50 wherein said comonomer is selected from the group consisting of dimethylaminoethylmethacrylate, dimethylaminoethylacrylate, 2-acrylamido-2-methyl propane sulfonic acid, and derivatives thereof.

52. The method of claim 51 wherein said polymer is a copolymer of acrylamide and dimethylamino-ethylmethacrylate-dimethyl sulfate.

53. The method of claim 51 wherein said polymer is a copolymer of acrylamide and dimethylaminoethylmethacrylate-methyl chloride.

54. The method of claim 51 wherein said polymer is a copolymer of acrylamide and dimethylaminoethylacrylate-methyl chloride.

55. The method of claim 51 wherein said polymer is a copolymer of acrylamide and 2-acrylamido-2-methyl propane sulfonic acid.

56. The method of claim 31 wherein said polymer is a homopolymer or copolymer of an acrylate salt.

57. The method of claim 31 wherein said polymer is a vinyl addition polymer.

58. The method of claim 31 wherein said polymer is a condensation polymer.

59. A method of carrying out a chemical reaction, comprising the steps of:
   (a) dissolving particles of a gel of a water soluble polymer in water to form a solution of said polymer according to the method of claim 1 or 31; and
   (b) reacting said solution with a chemical reactant.

60. The method of claim 59 wherein said polymer is nonionic polyacrylamide.

61. The method of claim 60 wherein said polyacrylamide is subjected to aminomethylation to produce aminomethylated polyacrylamide.

62. The method of claim 61 wherein said aminomethylated polyacrylamide is subsequently quaternized.

63. The method of claim 62 wherein said quaternization is carried out by reacting said aminomethylated polyacrylamide by reaction with methyl chloride or dimethyl sulfate.

64. The method of claim 60 wherein said polyacrylamide is reacted with caustic solution to hydrolyze said polyacrylamide to partial polyacrylate form.

65. The method of claim 1, 31 or 59 wherein said polymer has a molecular weight in the range of about 10,000 to 25,000,000.

66. The method of claim 1, 31 or 59 wherein said polymer is an acrylamide polymer having a molecular weight of at least 1,000,000.

* * * * *

UNITED STATES PATENT AND TRADEMARK OFFICE
CERTIFICATE OF CORRECTION

PATENT NO. : 4,845,192

DATED : July 4, 1989

INVENTOR(S) : Edwin T. Sortwell, et al.

It is certified that error appears in the above-identified patent and that said Letters Patent is hereby corrected as shown below:

Column 5, line 23 insert --200-- after "than".

Column 5, line 53 delete "25-14 30" and insert --25-30-- in lieu thereof.

Column 6, line 67 delete "28-30 blade/vane ang" and insert --0° blade/vane angle.-- in lieu thereof.

Claim 24, at column 9, line 19 delete "dimethylamine-ethylme-" and insert --dimethylamino-ethylme- -- in lieu thereof.

Claim 26, at column 9, line 25 delete "dimethyl-amino-ethyla-" and insert --dimethylamino-ethyla- -- in lieu thereof.

Signed and Sealed this

Fourth Day of December, 1990

Attest:

HARRY F. MANBECK, JR.

Attesting Officer

Commissioner of Patents and Trademarks